United States Patent
Rao

(10) Patent No.: US 10,802,155 B2
(45) Date of Patent: Oct. 13, 2020

(54) CROSS CORRELATION DETECTION IN A SATELLITE NAVIGATION RECEIVER

(71) Applicant: Accord Ideation Private Limited, Bengaluru (IN)

(72) Inventor: Vyasaraj Guru Rao, Bangalore (IN)

(73) Assignee: ACCORD IDEATION PRIVATE LIMITED, Bengaluru (IN)

( * ) Notice: Subject to any disclaimer, the term of this patent is extended or adjusted under 35 U.S.C. 154(b) by 326 days.

(21) Appl. No.: 15/811,705

(22) Filed: Nov. 14, 2017

(65) Prior Publication Data
US 2018/0081066 A1    Mar. 22, 2018

Related U.S. Application Data

(62) Division of application No. 14/020,854, filed on Sep. 8, 2013, now Pat. No. 9,864,065.

(30) Foreign Application Priority Data

Jul. 8, 2013   (IN) ........................ 3050/CHE/2013

(51) Int. Cl.
| | |
|---|---|
| *G01S 19/21* | (2010.01) |
| *G01S 19/27* | (2010.01) |
| *G01S 19/08* | (2010.01) |
| G01S 19/07 | (2010.01) |
| G01S 19/20 | (2010.01) |
| G01S 19/42 | (2010.01) |

(52) U.S. Cl.
CPC .............. *G01S 19/21* (2013.01); *G01S 19/08* (2013.01); *G01S 19/27* (2013.01); *G01S 19/07* (2013.01); *G01S 19/20* (2013.01); *G01S 19/42* (2013.01)

(58) Field of Classification Search
CPC .......... G01S 19/21; G01S 19/42; G01S 19/08; G01S 19/07; G01S 19/20; G01S 19/27
USPC ............ 342/357.25, 357.44, 357.45, 357.58, 342/357.59, 357.66
See application file for complete search history.

(56) References Cited

U.S. PATENT DOCUMENTS

| | | | |
|---|---|---|---|
| 6,211,822 B1 * | 4/2001 | Dougherty .............. | G01S 19/28 342/357.36 |
| 7,209,076 B2 * | 4/2007 | Roh ........................ | G01S 19/09 342/357.59 |

(Continued)

*Primary Examiner* — Chuong P Nguyen
(74) *Attorney, Agent, or Firm* — Rangarajan Sourirajan; Rajan Law Office, LLC

(57) ABSTRACT

A method and a system for defecting cross correlation in a satellite navigation receiver (SNR) in real time are provided. The SNR parallelly receives navigation signals from multiple satellites via multiple input channels. The SNR extracts ephemeris data from sub-frames of navigation data of each of the navigation signals. The SNR compares the ephemeris data of each navigation signal with the ephemeris data of another navigation signal. The SNR detects cross correlation between the navigation signals when the ephemeris data comparison results in a match and discards the navigation signal with low signal strength. The SNR also retrieves a ranging code from the sub-frames of navigation data of each navigation signal. The SNR compares the ranging code with a pre-programmed satellite identity code of a corresponding satellite. The SNR detects cross correlation when the code comparison results in a mismatch and discards the navigation signal with the mismatched ranging code.

3 Claims, 5 Drawing Sheets

(56) References Cited

U.S. PATENT DOCUMENTS

| | | | | |
|---|---|---|---|---|
| 7,623,070 | B2* | 11/2009 | Roh | G01S 19/09 |
| | | | | 342/357.59 |
| 7,636,060 | B2* | 12/2009 | Li | H04L 1/08 |
| | | | | 342/357.63 |
| 7,679,558 | B2* | 3/2010 | Imafuku | G01S 19/23 |
| | | | | 342/357.69 |
| 8,520,717 | B2* | 8/2013 | Brenner | G01S 19/36 |
| | | | | 342/352 |
| 8,830,123 | B2* | 9/2014 | Rao | G01S 19/24 |
| | | | | 342/357.63 |
| 8,907,843 | B2* | 12/2014 | Dooley | G01S 19/24 |
| | | | | 342/357.4 |
| 8,953,721 | B2* | 2/2015 | Nagahara | G01S 19/30 |
| | | | | 375/343 |
| 10,222,478 | B2* | 3/2019 | Tangudu | G01S 19/21 |
| 2004/0196183 | A1* | 10/2004 | Roh | G01S 19/21 |
| | | | | 342/357.25 |
| 2011/0103432 | A1* | 5/2011 | Tangudu | G01S 19/21 |
| | | | | 375/150 |

* cited by examiner

CROSS CORRELATION DETECTION IN A SATELLITE NAVIGATION RECEIVER

CROSS REFERENCE TO RELATED APPLICATIONS

This application is a divisional application of patent application Ser. No. 14/020,854 titled "Cross Correlation Detection In A Satellite Navigation Receiver", filed in the United States Patent and Trademark Office on Sep. 8, 2013, which claims the benefit of the following patent applications:
1. Non-provisional patent application no. 3050/CHE/2013 titled "Cross Correlation Detection In A Satellite Navigation Receiver", filed on Jul. 8, 2013 in the Indian Patent Office.
2. Non-provisional patent application number 4231/CHE/2011 titled "Navigation Data Structure Generation And Data Transmission For Optimal Time To First Fix", filed on Dec. 5, 2011 in the Indian Patent Office.
3. Non-provisional patent application number 4230/CHE/2011 titled "Satellite Navigation System For Optimal Time To First Fix Using Code And Carrier Diversity", filed on Dec. 5, 2011 in the Indian Patent Office.

The specifications of the above referenced patent applications are incorporated herein by reference in their entirety.

BACKGROUND

The advent of autonomous regional satellite based navigation systems has enabled some countries to cover their territorial footprint and the footprint of their surrounding areas. The purpose of a regional satellite based navigation system, for example, the Indian regional navigational satellite system (IRNSS), is to cater to the needs of specific users, for example, military personnel for military applications using a precision service (PS), and civilian users for civilian applications using a standard positioning service (SPS).

A number of issues need to be addressed in the design of a satellite navigation system, for example, sensitivity improvements, jamming margins, robustness towards spoofing, cross correlation detection, multipath related improvements, time to first fix (TTFF), etc., for ensuring the efficiency and robustness of the satellite navigation system. Cross correlation is a measure of agreement of two signals. Each satellite of a global positioning system (GPS) transmits a unique pseudorandom noise (PRN) code that does not correlate well with the PRN code of another satellite. In a global navigation satellite system (GNSS) receiver, correlation values are continuously compared against a threshold above which the GNSS receiver is used for subsequent operations. For example, measurement validity and tracking limits are typically compared against a specific carrier to noise density ($C/N_o$) ratio based on the category of the receiver. Typically, this threshold is kept as low as possible to effectively obtain a satellite signal.

Consider an example where a receiver tracks two satellites of a global positioning system (GPS) that transmit two pseudorandom noise (PRN) codes, for example, PRN-1 and PRN-2 respectively. One PRN code signal has a higher signal strength with respect to the other PRN code signal. In this example, PRN-1 is assumed at the lowest possible value and the PRN-2 is assumed at the extreme maximum permissible value within the dynamic range of the receiver. If the absolute difference in the signal strength for this pair of satellites exceeds the typical 22 decibel (dB) margin, the satellite that transmits PRN-1 will not be able to effectively discriminate itself from the satellite that transmits PRN-2, and thus the receiver starts to falsely track the satellite that transmits PRN-2 instead of tracking the satellite that transmits PRN-1. With false lock and navigation data continuously failing the integrity checks, for example, a cyclic redundancy check (CRC) or a parity check, the satellite channel is reset and the processing is attempted again. However, if the navigation data passes the integrity checks effectively, the satellite that transmits PRN-1 effectively will be tracking the data of the satellite that transmits PRN-2.

The individual signals from each satellite as observed at a user antenna is given, for example, by:

$$y_1(t) = A_1 r_1(t) d_1(t) \cos(2\pi f_1 t)$$

$$y_2(t) = A_2 r_2(t) d_2(t) \cos(2\pi f_1 t)$$

where A is the received amplitude, r(t) is the ranging code, d(t) is the navigation data transmitted by the satellites, and $f_1$ is the center frequency of the transmitted signal. The GNSS satellite antenna design ensues that the received signals from a user's local zenith or horizon are nearly the same to compensate for range variations. $A_1$ and $A_2$ vary due to a local phenomenon, for example, when the receiver obtains a direct and a reflected signal. The differential power level for a satellite pair exceeding 22 dB results in cross correlation. Under such a scenario within the receiver, the cross correlation on $y_1(t)$ results in a false tracking of $y_2(t)$ and as a fallout, $$d_2(t) = d_1(t)$$

To counter the above phenomenon, range differencing is adopted in civil aviation applications, which assumes the availability of almanac data, position, and time to detect a cross correlated signal. However, the detection of the cross correlated signal is not instantaneous, for example, at the data processing level.

Hence, there is a long felt but unresolved need for a method and a system that detect cross correlation within a frame of navigation data in real time and which obviate the dependence on almanac data from satellites for real time applications.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The method and the system disclosed herein address the above stated needs for detecting cross correlation within a frame of navigation data in real time and obviating the dependence on almanac data from satellites for real time applications. The method and the system disclosed herein detect cross correlation in a satellite navigation receiver in real time by comparing navigation data of various satellite signals, also referred to as navigation signals. In an embodiment, the method and the system disclosed herein also detect cross correlation in the satellite navigation receiver by comparing ranging codes of the navigation signals with pre-programmed satellite identity codes.

The satellite navigation receiver parallelly receives multiple navigation signals from multiple satellites via multiple input channels. Each of the navigation signals comprises sub-frames of navigation data. The satellite navigation receiver is configured to receive navigation data of each satellite via one of the input channels. The satellite navigation receiver verifies integrity of the navigation data in the sub-frames of navigation data, for determining accuracy of the navigation data. The satellite navigation receiver extracts ephemeris data from the sub-frames of navigation data of each of the navigation signals. For each input channel, the satellite navigation receiver stores the extracted ephemeris data from each of the navigation signals, separately, in a database. The satellite navigation receiver compares the extracted ephemeris data of each of the navigation signals received via one of the input channels with the extracted ephemeris data of another navigation signal received via another input channel. The satellite navigation receiver detects cross correlation between the navigation signals when the comparison of the extracted ephemeris data of each of the navigation signals received via one of the input channels with the extracted ephemeris data of another navigation signal received via another input channel results in a match. On detection of cross correlation between the navigation signals, the satellite navigation receiver discards the navigation data of the navigation signals with low signal strength.

In an embodiment, after parallelly receiving multiple navigation signals comprising sub-frames of navigation data from multiple satellites via multiple input channels, the satellite navigation receiver retrieves a ranging code from the sub-frames of navigation data of each of the navigation signals. The ranging code is unique to each of the satellites. The satellite navigation receiver compares the retrieved ranging code associated with each of the navigation signals with a satellite identity code of a corresponding satellite. The satellite identity code of each of the satellites is pre-programmed on the satellite navigation receiver. In this embodiment, the satellite navigation receiver detects cross correlation between the navigation signals when the comparison of the retrieved ranging code associated with each of the navigation signals with the satellite identity code of the corresponding satellite results in a mismatch. The satellite navigation receiver discards the navigation data of each of the navigation signals having the ranging code resulting in the mismatch when compared with the satellite identity code of the corresponding satellite.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

DETAILED DESCRIPTION OF THE INVENTION

Figure 1:
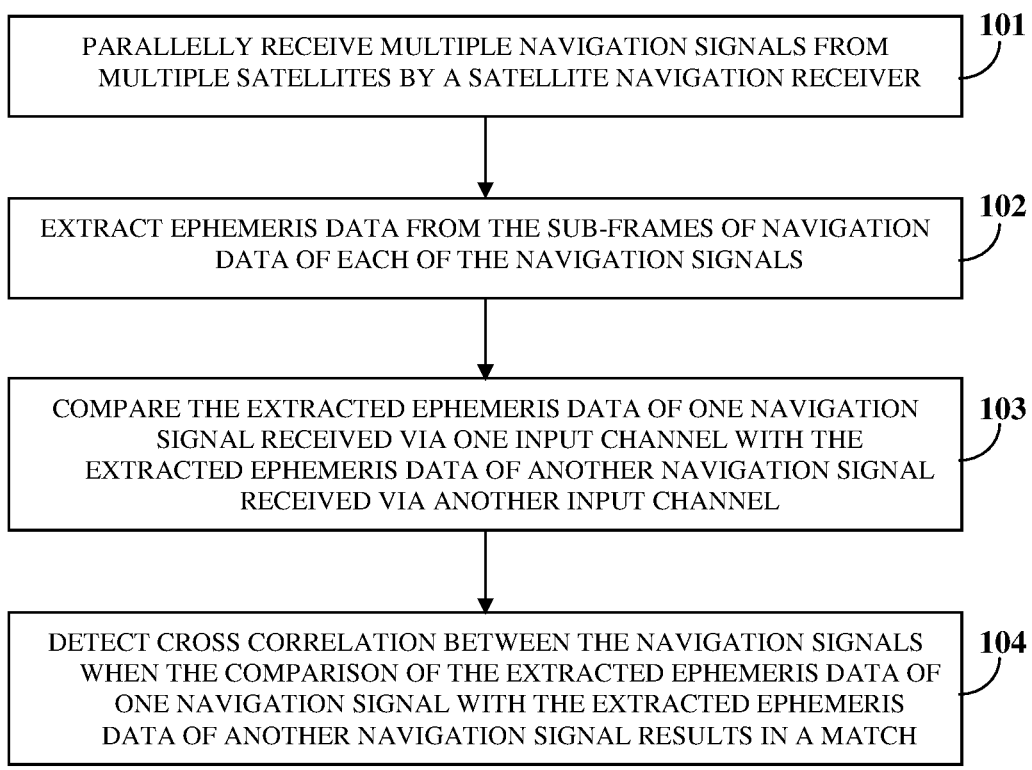
FIG. 1 illustrates a method for detecting cross correlation in a satellite navigation receiver in real time by comparing ephemeris data of various navigation signals.

FIG. 1 illustrates a method for detecting cross correlation in a satellite navigation receiver in real time by comparing ephemeris data of various navigation signals. The method and the system disclosed herein for detecting cross correlation is implemented by assuming that the cross correlation detection (CCD) occurs in real time and is declared within a sub-frame of navigation data. Furthermore, the cross correlation detection disclosed herein is applicable, for example, in a cold start mode of satellite navigation receiver operation. In the cold start mode, the satellite navigation receiver is powered on without any prior information. The cold start mode takes more time to compute the navigation solution as the satellite navigation receiver has to search the navigation signals of all the satellites of a global navigation satellite system (GNSS) constellation to obtain a signal lock, demodulate the data bits, and collect the entire navigation data.

The method and the system disclosed herein detect cross correlation based on navigation (NAV) data processing. For purposes of illustration, the detailed description is based on the proposed Indian regional navigational satellite system (IRNSS); however the scope of the method and the system disclosed herein is not limited to the IRNSS system but may be extended to any global navigation satellite system (GNSS). The IRNSS satellites are distributed as four geosynchronous satellites, two each in two planes, and three geostationary satellites. The method and the system disclosed herein assume that the navigation data from the satellites are different at any given instant. If the navigation data from the satellites are similar, the reason for the similarity is attributed to a local phenomenon in cross correlation.

The method disclosed herein detects cross correlation in a satellite navigation receiver in real time by comparing ephemeris data of various navigation signals. The ephemeris data comprises, for example, precise clock and Keplerian parameters that are typically updated, for example, once every two hours. The satellite navigation receiver parallelly receives 101 multiple navigation signals from multiple satellites via multiple input channels. Each of the navigation signals comprises sub-frames of navigation data. The satellite navigation receiver is configured to receive navigation data of each satellite via one of the input channels. The satellite navigation receiver verifies the integrity of the navigation data in the sub-frames of the navigation data for determining accuracy of the navigation data. For example, the satellite navigation receiver employs a cyclic redundancy check (CRC) on the received navigation data. The satellite navigation receiver compares the CRC seed embedded in the navigation data with an expected check value to detect accidental changes to the navigation data. The satellite navigation receiver extracts 102 ephemeris data from the sub-frames of navigation data of each of the navigation signals. For each input channel, the satellite navigation receiver stores the extracted ephemeris data from each of the navigation signals separately in a database. The database is a collection of stored data that is logically related and that is accessible by one or more users.

The satellite navigation receiver then compares 103 the extracted ephemeris data of one navigation signal received via one input channel with the extracted ephemeris data of another navigation signal received via another input channel. The satellite navigation receiver repeats the comparison process for all the navigation signals. The satellite navigation receiver detects 104 cross correlation between the navigation signals when the comparison of the extracted ephemeris data of one of the navigation signals received via one input channel with the extracted ephemeris data of another navigation signal results received via another input channel results in a match. The navigation data of any two satellites is not the same with respect to Keplerian and clock parameters comprising, for example, bias ($Af_0$), drift ($Af_1$), rate of change of drift ($Af_2$), etc. When a navigation signal of a satellite is cross correlated and if the navigation data passes the integrity checks, the navigation data of the weaker satellite channel will be the same as the navigation data of the satellite channel with higher signal strength. On detection of cross correlation between the navigation signals, the satellite navigation receiver discards the navigation data of the navigation signals with low signal strength.

The method disclosed herein is valid for ephemeris pages. However, this method is not completely applicable to a global positioning system (GPS) and/or a global navigation satellite system (GLONASS) operating at an L1 frequency. This is because sub-frame 4 and sub-frame 5 of the GPS navigation data structure, which constitutes the satellite almanac data, are similar for all the satellites in the GPS, and the strings 6 to 15 of the GLONASS navigation data, which constitutes the satellite almanac data, are similar for all the satellites in the GLONASS system. As disclosed in the co-pending patent application number 4231/CHE/2011 titled "Navigation Data Structure Generation and Data Transmission for Optimal Time to First Fix", in the IRNSS navigation data structure, the secondary data are distinct across sub-frames. This distinction ensures that the limitations observed in the GPS and/or the GLONASS operating at the L1 frequency with respect to cross correlation detection, are not present in the IRNSS.

Figure 2:
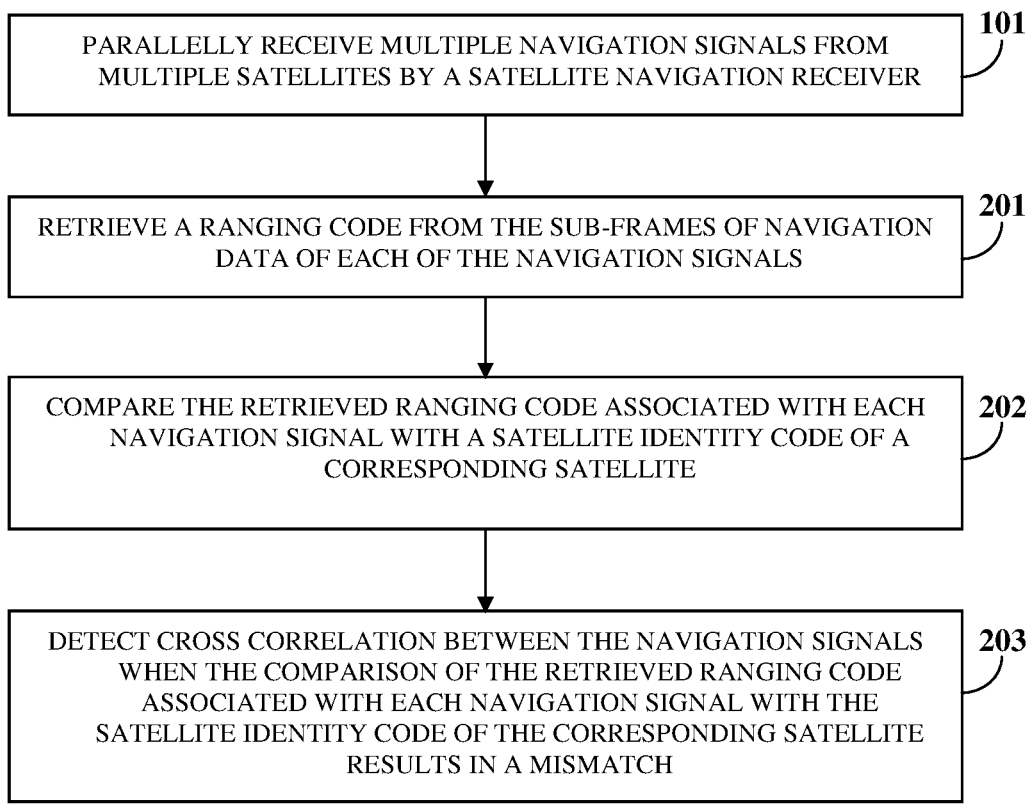
FIG. 2 illustrates an embodiment of the method for detecting cross correlation in a satellite navigation receiver in real time by comparing ranging codes of the navigation signals with pre-programmed satellite identity codes.

FIG. 2 illustrates an embodiment of the method for detecting cross correlation in a satellite navigation receiver in real time by comparing ranging codes of the navigation signals with pre-programmed satellite identity codes. In this embodiment, the method and the system disclosed herein detect cross correlation based on satellite vehicle identification (SVID). The satellite navigation receiver parallelly receives 101 multiple navigation signals from multiple satellites via multiple input channels and verifies the integrity of the navigation data in the sub-frames of navigation data as disclosed in the detailed description of FIG. 1. The satellite navigation receiver retrieves 201 a ranging code from the sub-frames of navigation data of each of the navigation signals. The ranging code is for example, a pseudo random noise (PRN) code that is unique to each of the satellites. Each satellite transmits a different pseudo random noise code which allows the navigation signals to be simultaneously transmitted from several satellites and to be simultaneously received by the satellite navigation receiver, with minimal interference from one another.

The satellite navigation receiver compares 202 the retrieved ranging code associated with each of the navigation signals with a satellite identity code of the corresponding satellite. According to the navigation data structure disclosed in the co-pending patent application number 4231/CHE/2011 titled "Navigation Data Structure Generation and Data Transmission for Optimal Time to First Fix", each page of the navigation data structure of the Indian regional navigational satellite system (IRNSS) has a unique satellite identity, unlike the global positioning system (GPS) operating at the L1 frequency. The navigation data structure disclosed in the co-pending patent application number 4231/CHE/2011 titled "Navigation Data Structure Generation and Data Transmission for Optimal Time to Fust Fix" comprises a first sub-frame and a second sub-frame configured to accommodate selective ephemeris data of the navigation data, a third sub-frame configured to accommodate first parameters of almanac data of the navigation data, and a fourth sub-frame configured to accommodate a text message comprising second parameters of the almanac data. The first parameters of the almanac data accommodated in the third sub-frame of the generated navigation data structure comprise, for example, ionosphere coefficients. The second parameters of the almanac data accommodated in the fourth sub-frame of the generated navigation data structure comprise, for example, coordinated universal time (UTC) parameters. The text message in the fourth sub-frame further comprises, for example, periodic non-positioning information extracted from the first sub-frame, the second sub-frame, and the third sub-frame. This navigation data structure is used to assist staggering messages across satellites as a part of a secondary navigation data set. The satellite identity code of each of the satellites is pre-programmed on the satellite navigation receiver. The satellite navigation receiver detects 203 cross correlation between the navigation signals when the comparison of the retrieved ranging code associated with each of the navigation signals with the satellite identity code of the corresponding satellite results in a mismatch. The satellite navigation receiver discards the navigation data of each of the navigation signals having the ranging code resulting in the mismatch when compared with the satellite identity code of the corresponding satellite.

Figure 3:
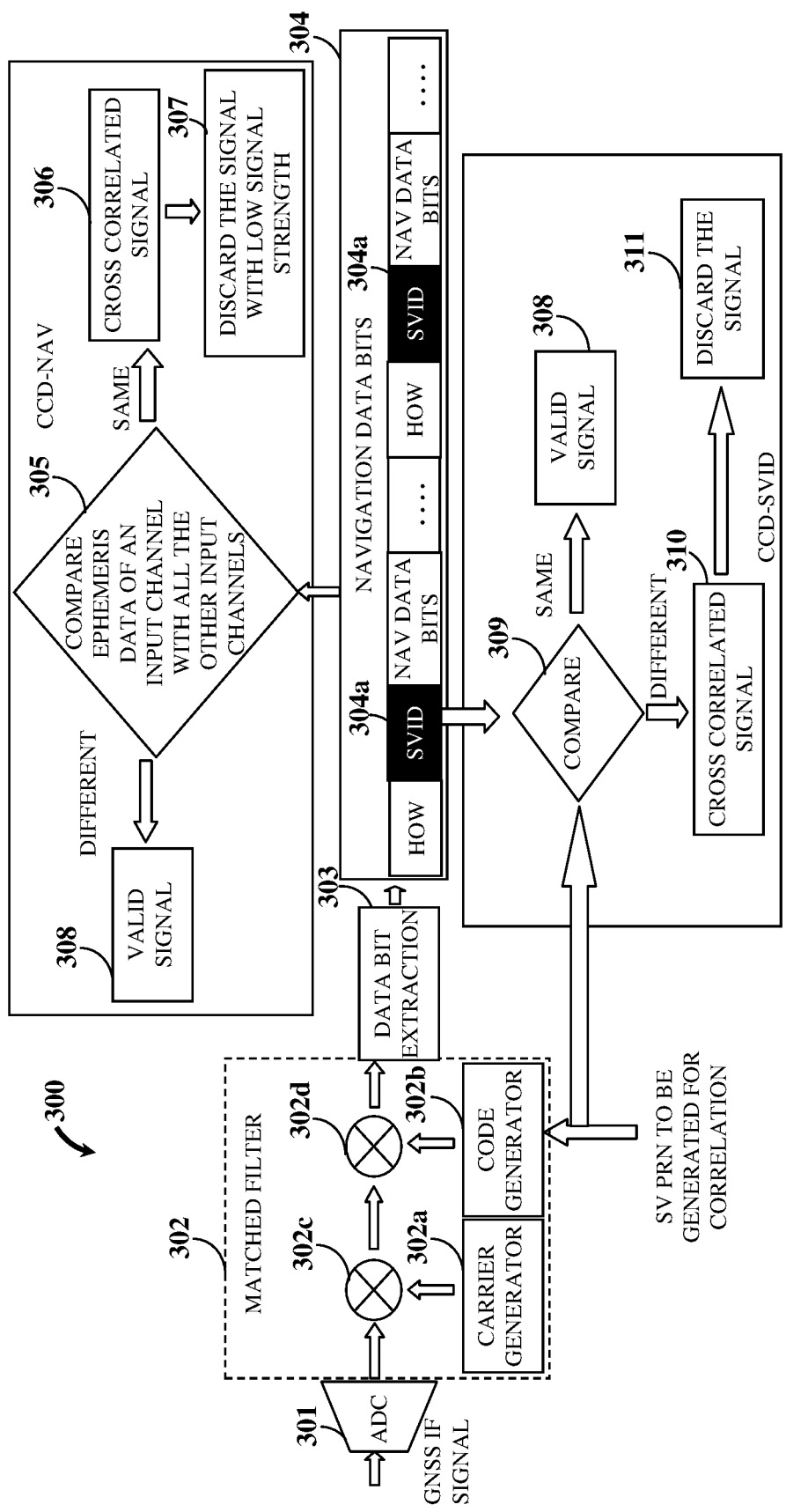
FIG. 3 exemplarily illustrates a process flow diagram comprising the steps performed by a satellite navigation receiver for detecting cross correlation between navigation signals.

FIG. 3 exemplarily illustrates a process How diagram comprising the steps performed by the satellite navigation receiver for detecting cross correlation between navigation signals. The satellite navigation receiver incorporates a cross correlation detection system 300 as exemplarily illustrated in FIG. 3. FIG. 3 exemplarily illustrates the process steps performed by each component of the cross correlation detection system 300 to detect cross correlation between the navigation signals. The cross correlation detection system 300 of the satellite navigation receiver disclosed herein comprises an analog to digital converter (ADC) 301 operably coupled to a matched filter 302. The matched filter 302 shows that the pseudorandom noise (PRN) code used to generate a local replica of the ranging code is known to the satellite navigation receiver on a given satellite channel. For example, in a satellite navigation receiver with 12 input channels, all the input channels are programmed with a unique PRN identity or PRN code. The analog to digital converter 301 receives intermediate frequency satellite signals from global navigation satellite system (GNSS) satellites and converts the analog satellite signals to digital satellite signals also referred to as navigation signals.

The matched filter 302 comprises a carrier generator 302a, a code generator 302b, and adders 302c and 302d. The code generator 302b generates one or more operation service codes, for example, the PRN codes. The carrier generator 302a generates in-phase (sine) and quadrature phase (cosine) intermediate frequency (IF) carrier signals corresponding to one or more of multiple carrier frequencies. The adder 302d add the sub-frames of navigation data from the received navigation signals with one or more of the operation service codes for generating service code modulated navigation data. The adder 302c combines the digital satellite signal with a carrier signal generated by the carrier generator 302a and the internally generated PRN code generated by the code generator 302b to generate the modulated navigation data. The cross correlation detection system 300 verifies the integrity of the navigation data and performs data bit extraction 303 on the modulated navigation data to extract navigation data bits 304. That is the cross correlation detection system 300 extracts ephemeris data after the integrity checks. The cross correlation detection system 300 stores the navigation data bits 394 separately for each input channel of the satellite navigation receiver, for example, in a database, a memory unit or a storage device (not shown).

The cross correlation detection system 300 compares 305 the stored navigation data bits 304 comprising ephemeris data received via each input channel with the navigation data bits 304 comprising ephemeris data received via another input channel. The cross correlation detection system 300 performs N−1 comparisons, where N is the number of tracking and sub-frame synched channels. If a match is determined, the cross correlation detection system 300 considers the navigation signal of the input channel with the lower carrier to noise density ($C/N_o$) as a cross correlated signal 306. The cross correlated signal 306 is an invalid signal and the cross correlation detection system 300 discards 307 the navigation data bits 304 of the navigation signal with low signal strength. If the comparison 305 results in a mismatch, that is, if the ephemeris data of one navigation signal received via one input channel is different from the ephemeris data of another navigation signal received via another input channel, then the compared navigation signals are considered as valid signals 308.

In an embodiment, post detection of a navigation signal, the cross correlation detection system 300 performs validation and data bit extraction 303 on the navigation data to extract the navigation data bits 304. Subsequently, the cross correlation detection system 300 extracts the satellite vehicle identification (SVID) code or the PRN code 304a from the navigation data bits 304 and compares 309 the PRN code 304a with the satellite identity code programmed into the satellite navigation receiver in accordance with field programmable gate array (FPGA) standards. The method disclosed herein ensures the validity of the navigation signal with respect to cross correlation. If the comparison 309 of the PRN code 304a with the satellite identity code results in a mismatch, then the cross correlation detection system 300 considers the corresponding navigation signal to be cross correlated signal 310 and discards 311 the corresponding navigation signal. If a match is determined during the comparison 309 between the PRN code 304a and the satellite identity code, then the cross correlation detection system 300 considers the corresponding navigation signal to be a valid signal 308.

The methods to detect cross correlation by the cross correlation detection system 300 of the satellite navigation receiver as disclosed in the detailed descriptions of FIG. 1, FIG. 2, and FIG. 3 ensure that integrity with respect to cross correlation is guaranteed for any navigation signal that has passed the data level checks. The cross correlation detection methods disclosed herein provide instantaneous detection of cross correlation and ensure that when the navigation data is presented, integrity with respect to cross correlation is assured. The cross correlation detection methods disclosed herein do not depend on any satellite navigation receiver parameters or external inputs. The cross correlation detection occurs prior to measurement formulation and thus ensures that the system time even with a single satellite is guaranteed for cross correlation. Measurement formulation is the construction of pseudoranges requited for position estimation for which the basis is system time. The cross correlation detection method based on the PRN codes and/or satellite identity codes disclosed herein does not depend on two navigation signals, that is, the need for comparing two navigation signals is precluded and thus the system time is guaranteed even with one satellite. The cross correlation detection method disclosed herein precludes the need for tracking two satellites, demodulating the navigation data of the two satellites, and comparing the navigation data of the two satellites. The cross correlation detection methods disclosed herein detect cross correlation and obviate the dependence on the almanac data from satellites for any real time applications.

Figure 4:
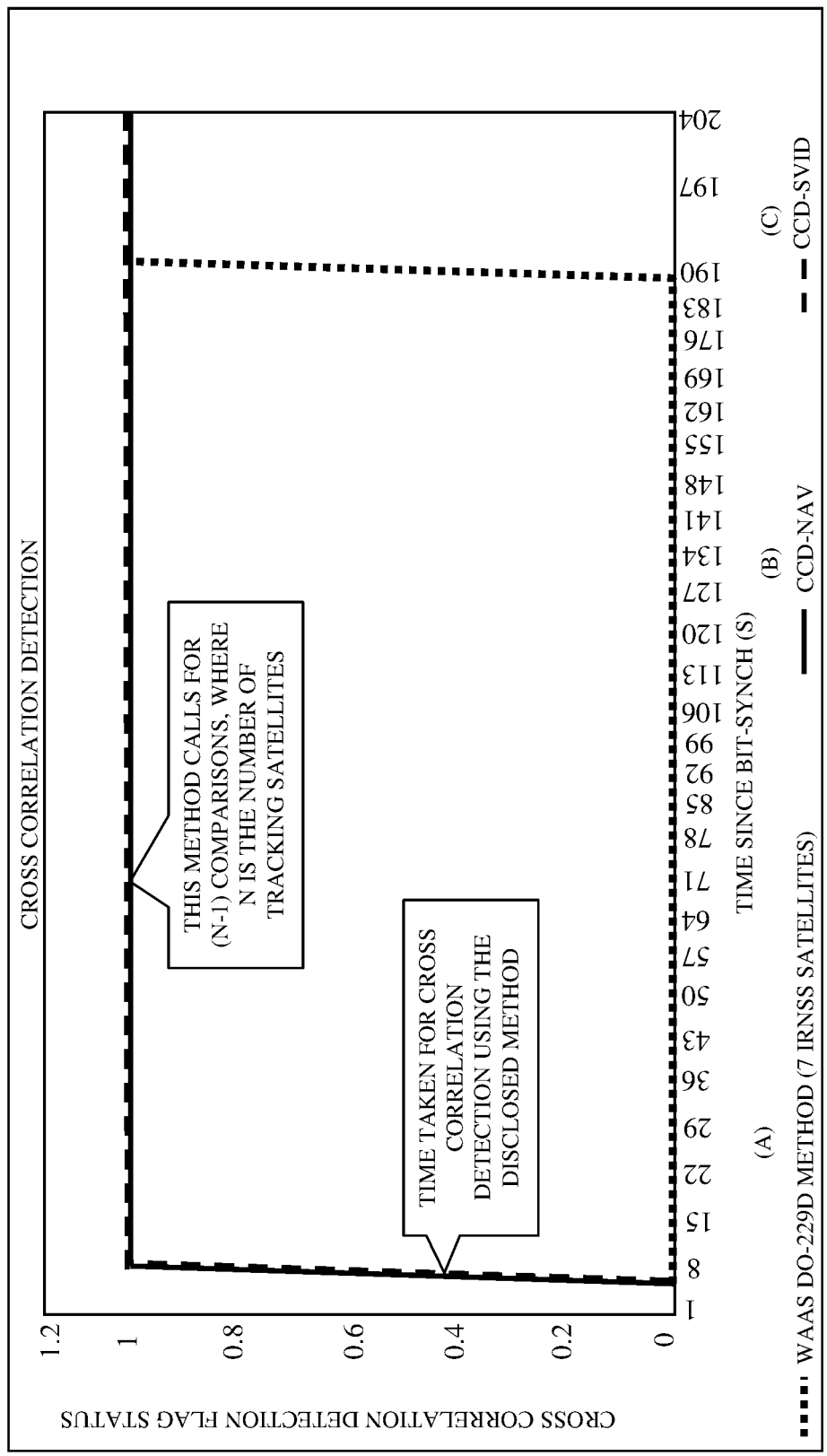
FIG. 4 exemplarily illustrates a graphical representation showing time taken to detect cross correlation using different methods.

FIG. 4 exemplarily illustrates a graphical representation showing time taken to detect cross correlation using different methods. To validate the performance of the cross correlation detection methods disclosed herein, a test setup comprising a signal generation system also referred to as a "simulator" and a satellite navigation receiver as disclosed in the co-pending patent application titled "Navigation Data Structure Generation and Data Transmission for Optimal Time to First Fix" is adopted with a few changes. A simulator input, instead of a radio frequency (RF) signal from a satellite, is directly fed to the satellite navigation receiver port. The signal strength on each channel of the simulator is varied, for example, from about −20 decibels (dB) to about 20 dB, about an absolute power setting in the range of, for example, about −110 decibel per milliwatt (dBmW) to about −150 dBmW. This simulator and satellite navigation receiver setup is used to simulate a cross correlation effect. At the start of the simulation, the power on one channel is maintained relatively high compared to the other channels and is then disabled. Two versions of the simulator software are used: one version of the simulator software for the IRNSS with navigation data similar to GPS L1 and another version of the simulator software for carrier diversity as disclosed in the co-pending non-provisional patent application number 4230/CHE/2011 titled "Satellite Navigation System For Optimal Time To First Fix Using Code And Carrier Diversity". The receiver software used in the co-pending patent application number 4231/CHE/2011 titled "Navigation Data Structure Generation and Data Transmission for Optimal Time to First Fix" is modified to incorporate the logic of range differencing.

Initially, the channel configured for high power and two other channels of the simulator are disabled. The satellite navigation receiver, with the input from the simulator, computes a position within 24 seconds. Subsequently, the channel configured for high power and the two other channels are enabled. This channel acquired the navigation signal and in addition, cross correlation on another channel is observed. However, the satellite navigation receiver takes 192 seconds post bit synchronization of the first channel to collect the almanac data after which the range differencing method is invoked. With the almanac data, the satellite navigation receiver declares the cross correlated channel based on range differencing, that is, the difference between the pseudorange and the estimated range. The trial is conducted on different satellite identity codes by varying power levels on the simulator. The results of the trial are exemplarily illustrated in FIG. 4.

To demonstrate the performance of the methods disclosed herein, corresponding receiver software is generated. For example, a receiver software is generated for navigation data based comparison for cross correlation detection disclosed in the detailed description of FIG. 1. In an embodiment, another receiver software is generated for satellite vehicle identification (SVID) based comparison for cross correlation detection disclosed in the detailed description of FIG. 2. An integrity flag is used and logged from the bit-synchronization of a channel. The simulator is modified to operate in a carrier diversity mode as disclosed in the co-pending patent application number 4230/CHE/2011 titled "Satellite Navigation System For Optimal Time To First Fix Using Code And Carrier Diversity". The test setup is similar to that of the previous trial disclosed above with respect to the simulator. The satellite navigation receiver is run with two versions of receiver software independently—one version is run with navigation data processing and the other version is run based on the SVTD. Unlike range differencing, only two satellites are used: one satellite with high signal strength settings and another satellite with low signal strength settings, respectively on the simulator. The results from both the methods disclosed herein demonstrate that with the NAV data collection and/or the SVID identification, the cross correlation detection is identified within 6 seconds of tracking as exemplarily illustrated in FIG. 4. In comparison with the existing cross correlation detection methods, the methods disclosed herein demonstrate an improved cross correlation detection performance as exemplarily illustrated in FIG. 4.

The disclosed navigation data processing method is applicable to the GPS and the GLONASS L1 partially. This is based on the input that ephemeris data sub-frames of the navigation data structure of the GPS and the GLONASS L1 are different and thus the navigation data processing method is applicable. The satellite vehicle identification is not present in the navigation data structure of the GPS and/or the GLONASS L1. In addition, a similar scenario arises when almanac data and/or textual messages are transmitted in the frequency bands of the emerging GNSS, for example, L2C, L5, and E1 frequency band of the European satellite navigation system Galileo. By adopting the SVTD detection method, the partial limitation is resolved in the emerging satellite navigation systems. Partial limitation is the assumption that the almanac data and the textual messages part of the navigation data are similar across all satellites, which violates the assumption that the navigation data transmitted by the satellites is distinct across the satellites at any given instant of time. Thus, the methods disclosed herein, in combination, can become the defacto standard for civil aviation applications and, in general, the defacto standard for any navigation based application.

Figure 5:
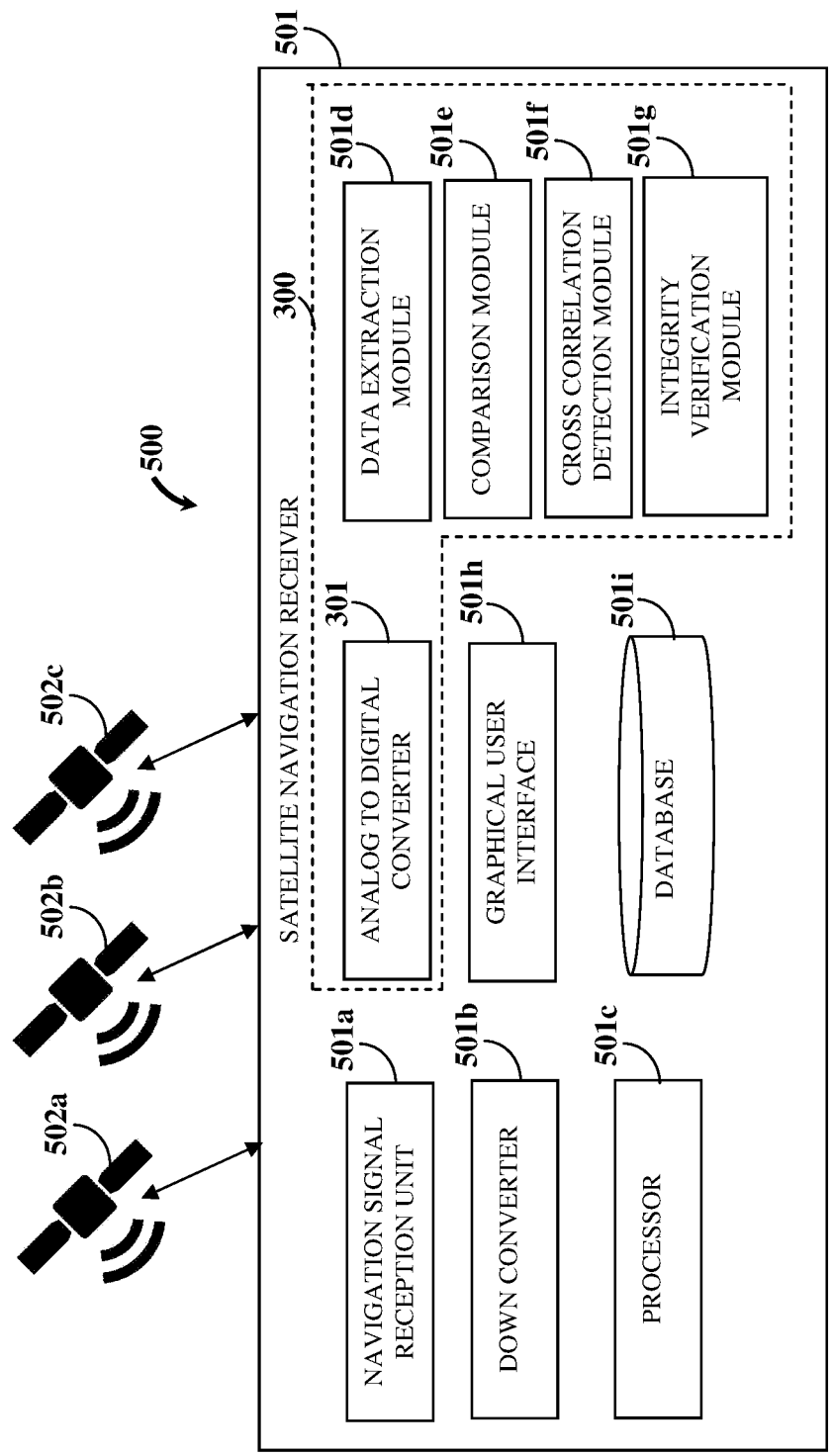
FIG. 5 exemplarily illustrates a system for detecting cross correlation in a satellite navigation receiver in real time.

FIG. 5 illustrates a system 500 for detecting cross correlation in a satellite navigation receiver 501 in real time. The system 500 disclosed herein comprises the cross correlation detection system 300 incorporated in the satellite navigation receiver 501. The satellite navigation receiver 501 comprises a graphical user interface (GUI) 501h, a navigation signal reception unit 501a, a radio frequency down converter 501b, the cross correlation detection system 300, and a database 501i. The navigation signal reception unit 501a parallelly receives multiple navigation signals from multiple satellites 502a, 502b, and 502c via multiple input channels. Each navigation signal comprises sub-frames of navigation data. The navigation signal reception unit 501a receives the navigation data of each of the satellites 502a, 502b, and 502c via one input channel. The radio frequency down converter 501b converts the received radio frequency navigation signals to intermediate frequency (IF) signals. The satellite navigation receiver 501 further comprises at least one processor 501c and a non-transitory computer readable storage medium communicatively coupled to the processor 501c. The non-transitory computer readable storage medium is configured to store modules 501d, 501e, 501f, and 501g of the cross correlation detection system 390 of the satellite navigation receiver 501. The processor 501c is configured to execute the modules 501d, 501e, 501f, and 501g of the cross correlation detection system 300 of the satellite navigation receiver 501.

The cross correlation detection system 300 comprises an analog to digital converter 301, a data extraction module 501d, a comparison module 501e, a cross correlation detection module 501f, and an integrity verification module 501g. The modules 501d, 501e, 501f, and 501g of the cross correlation detection system 300 constitute the receiver software disclosed in the detailed description of FIG. 4. The analog to digital converter 301 converts the intermediate frequency signals to digital samples. The data extraction module 501d extracts ephemeris data from the sub-frames of navigation data of each navigation signal. The data extraction module 501d stores each extracted ephemeris data from each navigation signal separately in the database 501i for each input channel. In an embodiment, the database 501i is an array and/or a memory structure for storing the extracted ephemeris data from each navigation signal. In another embodiment, the database 501i is any storage area or medium that can be used for storing data. In another embodiment, the database 501i can be remotely accessed by the satellite navigation receiver 501 via a network (not shown).

The integrity verification module 501g verifies integrity of the navigation data in the sub-frames of navigation data for determining accuracy of the navigation data. The comparison module 501e compares the extracted ephemeris data of each of the navigation signals received via one of the input channels with the extracted ephemeris data of another navigation signal received via another input channel. The cross correlation detection module 501f detects cross correlation between the navigation signals when the comparison of the extracted ephemeris data of each of the navigation signals received via one of the input channels with the ephemeris data of another navigation signal received via another input channel results in a match. The cross correlation detection module 501f discards the navigation data of the navigation signals with low signal strength on the detection of the cross correlation between the navigation signals.

In an embodiment, the data extraction module 501d retrieves a ranging code from the sub-frames of navigation data of each of the navigation signals. The ranging code is unique to each of the satellites 502a, 502b, and 502c. In this embodiment, the comparison module 501e compares the retrieved ranging code associated with each of the navigation signals with a satellite identity code of the corresponding satellite 502a, 502b, or 502c. The satellite identity code of each of the satellites 502a, 502b, and 502c is preprogrammed on the satellite navigation receiver 501. The cross correlation detection module 501f detects cross correlation between the navigation signals when the comparison of the retrieved ranging code associated with each of the navigation signals with the satellite identity code of the corresponding satellite 502a, 502b, or 502c results in a mismatch. The cross correlation detection module 501f discards the navigation data of each of the navigation signals having the ranging code resulting in the mismatch when compared with the satellite identity code of the corresponding satellite 502a, 502b, or 502c. The processor 501c of the satellite navigation receiver 501 retrieves instructions defined by the data extraction module 501d, the comparison module 501e, the cross correlation detection module 501f, and the integrity verification module 501*g*, and executes the instructions, thereby performing one or more processes defined by those instructions.

The GUI 501*h* profiles navigation data measurements, the status of reception of the navigation data, health measurements of the satellites 502*a*, 502*b*, and 502*c*, etc. The GUI 501*h*, for example, displays individual satellite identifiers, acquisition and tracking status with reference to the collection of the navigation data, the constellation number, position coordinates of the satellites 502*a*, 502*b*, and 502*c* with reference to the earth-centered, earth-fixed (ECEF) coordinate system, a geographical position of a user, that is, the latitude, longitude, and altitude of the user, the time to first fix (TTFF), the geographical position of the user such as the latitude, longitude, and altitude of the user, etc.

The foregoing examples have been provided merely for the purpose of explanation and are m no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein: rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A system for detecting cross correlation in a satellite navigation receiver in real time, comprising:
    at least one processor;
    a navigation signal reception unit configured to receive navigation signals from a plurality of satellites, said navigation signal reception unit comprising a plurality of input channels, wherein each of said plurality of input channels is configured to receive a navigational signal from one of said plurality of satellites, and wherein each of said received navigation signals comprises sub-frames of navigation data;
    a non-transitory computer readable storage medium communicatively coupled to said at least one processor and storing modules of said satellite navigation receiver, said at least one processor configured to execute said modules of said satellite navigation receiver, said modules of said satellite navigation receiver comprising:
        a data extraction module configured to extract ephemeris data from said sub-frames of said navigation data received via each of said input channels, wherein said ephemeris data extracted from said sub-frames of said navigation data received via each of said input channels is stored separately in a database;
        a comparison module configured to compare ephemeris data extracted from said sub-frames of said navigation data received via each of said input channels with ephemeris data extracted from said sub-frames of said navigation data received via each of other of said input channels; and
        a cross correlation detection module configured to detect said cross correlation between said received navigation signals when ephemeris data extracted from said sub-frames of said navigation data received via any of said input channels matches with ephemeris data extracted from said sub-frames of said navigation data received via another of said input channels.

2. The system of claim 1, wherein said cross correlation detection module is further configured to discard said navigation data of a received navigation signal that has a lower signal strength of two compared navigation signals, whenever result of said comparison of received navigation signals results in a match.

3. The system of claim 1, wherein said modules of said satellite navigation receiver further comprise an integrity verification module configured to verify integrity of said navigation data in said sub-frames of said navigation data for determining accuracy of said navigation data.

* * * * *